(No Model.) 2 Sheets—Sheet 1.
M. O. ROYCE.
APPARATUS FOR RAKING AND LOADING HAY.
No. 386,897. Patented July 31, 1888.
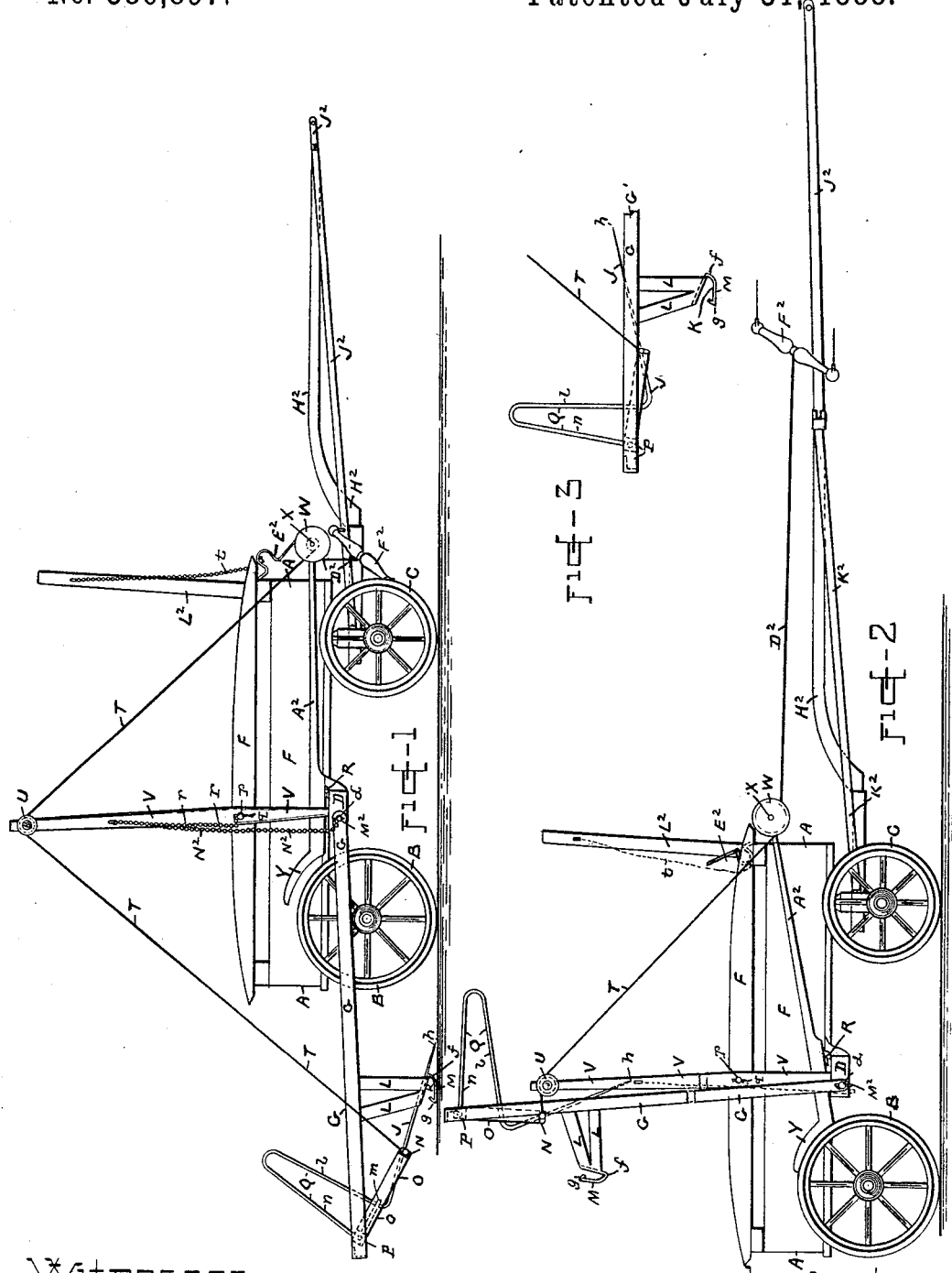
Witnesses,
Chas. K. Fitch.
Marion E. Brown.
Inventor.
Marvin O. Royce,
by his Atty's
Brown Bros.
N. PETERS, Photo-Lithographer, Washington, D. C.

(No Model.) 2 Sheets—Sheet 2.
M. O. ROYCE.
APPARATUS FOR RAKING AND LOADING HAY.
No. 386,897. Patented July 31, 1888.
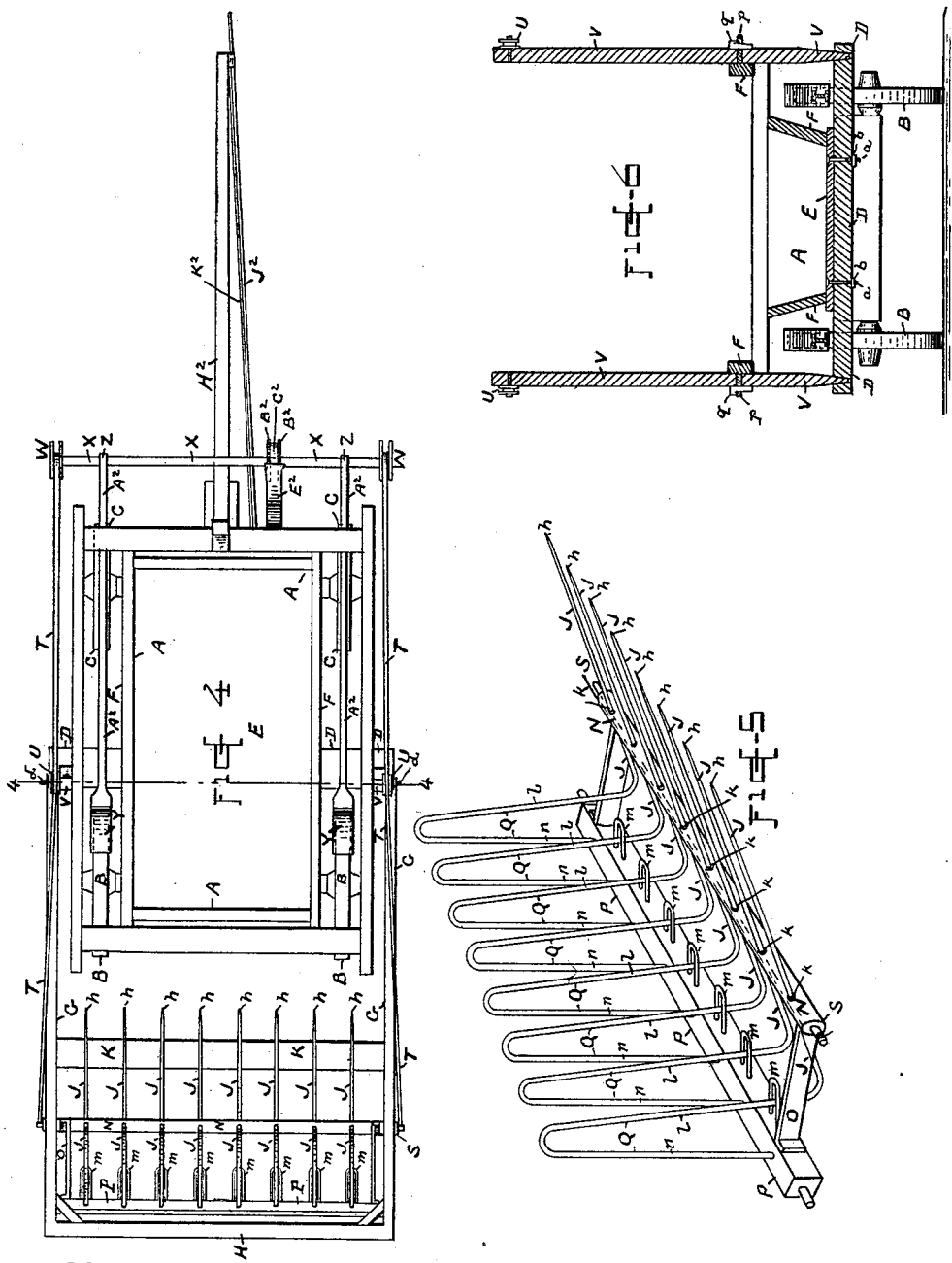

UNITED STATES PATENT OFFICE.

MARVIN OWEN ROYCE, OF EAST SOMERVILLE, MASSACHUSETTS.

APPARATUS FOR RAKING AND LOADING HAY.

SPECIFICATION forming part of Letters Patent No. 386,897, dated July 31, 1888.

Application filed June 29, 1887. Serial No. 242,920. (No model.)

*To all whom it may concern:*

Be it known that I, MARVIN OWEN ROYCE, of East Somerville, in the county of Middlesex and State of Massachusetts, have invented certain new and useful Improvements in Apparatus for Raking, Pitching, and Loading Hay into Wagons, of which the following is a full, clear, and exact description.

The objects of this invention are mainly to secure an apparatus for raking, pitching, and loading hay into a wagon to which the apparatus is applied, that is simple, practical, and efficient in construction and operation, and, as a whole, capable of ready and convenient attachment to and detachment from the wagon, and its raking mechanism also capable of a special and separate attachment and detachment from the other mechanism for pitching and loading the so-raked hay into the wagon, and having all the operative mechanism for pitching and loading arranged to be worked by the draft and pull of a horse or horses harnessed to the wagon to which the apparatus is applied.

The raking apparatus of this invention, as a whole and in substance, consists of a horizontal frame, at one end journaled on and extended to the rear of a wagon-body or other suitable support, a hay-rake having spring-teeth separately adapted to yield backward and upward, and which is horizontally journaled on the rear of said frame, crossing from side to side thereof, and is arranged for its teeth to be placed in and out of raking position and into and out of position to dump their contents into the wagon, a shoe-plate fixed on said frame and under the rake-teeth, and to rest and ride over the ground just behind the points of the rake-teeth, brake-shoes to brake the wheels of the wagon, and adapted to be applied to the wheels by the horses harnessed to the wagon, and all combined and arranged together, and otherwise separately constructed and operating substantially as hereinafter described.

In the drawings forming part of this specification, Figure 1 is a side elevation of the apparatus of this invention and as attached to the body of a wagon, and the whole in its operative position to rake hay on the ground over which the wagon is drawn, and the wagon being shown as suitably adapted for the harnessing thereto of a pair of horses. Fig. 2 is a similar elevation to Fig. 1, but with the rake raised into position to dump the hay carried by it into the wagon, and the other parts of the apparatus in their proper relative positions. Fig. 3 is a side view, in detail, of the rake, as hereinafter appears. Fig. 4 is a plan view of Fig. 1. Fig. 5 is a perspective view of the hay-rake proper, detached from its supporting frame or carrier and as in its raised position preparatory to being swung to and over the wagon to pitch and dump therein the hay carried by it; and Fig. 6 is a transverse vertical section, line 6 6, Fig. 1, and looking toward the rear end of the wagon-body.

In the drawings, A represents the body of a wagon suitable to serve the purposes of transporting hay, and having hind and front wheels, B B and C C, respectively, and all otherwise constructed and arranged in all its parts, as well known, and which in themselves constitute no feature of the present invention, except as the same may hereinafter particularly appear, and therefore needing no more particular description herein.

D is a cross-bar extending across and under the floor or bottom E of the wagon-body A, in front of the hind wheels, B B, and between them and the front wheels, C C. This cross-bar D is rigidly secured, by headed screw-bolts *a* and screw-nuts *b*, at suitable points thereof, Fig. 6, to the floor or bottom E of the wagon-body. This cross-bar D projects beyond each side F of the wagon-body and the hind wheels, B B, and on the outside of each of such projecting ends are hung, on horizontal pivots *d*, the forward ends of two parallel horizontal side rails, G, extending therefrom to the rear of the wagon-body, and there joined by a horizontal cross-rail, H, the whole making a horizontal frame and carrying a series of rake-teeth, J, made of spring-wire, as hereinafter fully appears.

K is a horizontal shoe plate attached to and crossing between side uprights, L L, fastened at their upper ends to the side rails, G, of frame G H. The under side, M, of the shoe-plate K is curved across its width and rests on the ground, and its front edge, $f$, is rounded and higher than its rear edge, $g$, and practically the rest of the shoe on the ground is back of its front edge, so as thereby to reduce to the minimum the liability of the shoe catching against and being retarded by obstructions of the ground, should it meet with any in its travel over the same, and to give it the maximum capability of freely riding over them.

The shoe plate K above described is also under the rake teeth J, which are severally parallel with each other, and in their normal position have their points $h$ in front of the front edge, $f$, of and in a line parallel, or substantially so, with the shoe-plate K, extending therefrom in a somewhat upwardly-inclining direction across and above the shoe-plate K, beyond the rear edge, $g$, thereof, and there entering into and passing through guide-eyes $k$, having a diameter larger than that of the rake-teeth, so that the rake teeth may have a free movement therein in all directions, and severally of a common horizontal cross piece or rail, N, and attached at each end by right-angular end supports, O, to a common horizontal cross rod or bar, P, located above said guide-rail N, and each of its opposite ends journaled in the side piece or rails, G, of the horizontal frame, which is pivoted to the attached cross-bar D of the wagon-body, as before described. The rake-teeth J, entering into and passing through the guide eyes $k$, as above described, are continued with an upright bend or inverted-∧ form, as at Q, with its angle uppermost and its forward leg, $l$, near the lower end, passing through a horizontal projecting and elongated guide-eye, $m$, of the journaled cross-rod P, and the rear leg, $n$, entered into and thus attached to said cross-rod P, which completes the construction and attachment of rake-teeth to their carrier, consisting of the rod P, journaled as aforesaid, with its guide-eyes $m$, and the cross-piece N, with its guide-eyes $k$.

The cross-rail N has opposite end portions, S, projecting under and horizontally beyond the outside edge of the side rails, G, of the frame G H, pivoted to the wagon-body, as explained.

T are lines—such as ropes, chains, &c.—hung or otherwise suitably connected to said end projections, S, of the rod N, and each extending upward and forward therefrom to and over the upper side of separate grooved vertical pulleys U, that are located at the upper ends of separate standards V, detachably and rigidly fastened to the sides of wagon-body by means of horizontal pins $p$, which pass through them and are secured to the wagon-sides, and a key-pin, $q$, inserted in the outer projecting end of the pins $p$, preferably hung by a safety-chain, $r$, to said standards. Each standard at its lower end is entered into a correspondingly-shaped socket of the cross-bar D of the wagon-body, and which, co-operating with the fastening of standards, as above stated, to sides of wagon-body, obviously secures the standards most rigidly, while at the same time they are susceptible of most ready and convenient attachment and detachment.

The lines T, before referred to, continue from the pulleys U in a downwardly-inclining direction, and are attached to separate winding-pulleys, W, at the opposite ends of a horizontal shaft located in front of the wagon-body, and which at its opposite end portions turns in suitable bearings of the front or forward ends, Z, of horizontal lever-arms $A^2$, extending along the outside of the wagon-sides toward the hind wheels, and there horizontally hinged at R to the upper side of the cross-bar D, before referred to, and extending from said hinged portion to and over the tread of the hind wheels, and in such extension constructed and arranged, as brake-shoes Y, to be brought, as hereinafter explained, on the tread of said hind wheels, to act as brakes thereto and thereby to hold them against turning.

$B^2$ is a ratchet-wheel turning with horizontal shaft X, in two parts, separated by a groove, $C^2$, into which is entered a line, $D^2$—such as a rope, chain, &c.—and attached to shaft X. $E^2$ is a pawl suspended from and hinged to front of wagon-body in position to be engaged with ratchet-wheel $B^2$ at its upper side, so as thus to hold it and its carrying-shaft against turning and for it to be free to be disengaged to permit same to be turned, as will hereinafter fully appear. The line $D^2$, secured to ratchet-shaft X in the normal position, or, rather, raking position, of the rake-teeth J, Figs. 1 and 4, is fully wound upon the ratchet-shaft, and the lines T, connecting said shaft to the frame having the rake-teeth directly attached to it, as described, are wholly unwound from the same shaft. Furthermore, the outer end of line $D^2$ is secured to one whiffletree, $E^2$, of a double whiffletree, and the other whiffletree (not shown) of the wagon is hung, as usual, to the wagon.

$H^2$ is the usual center pole of the wagon and the horse harnessed to the whiffletree, hung, as usual, to this pole, as well known, and the other horse is harnessed to the whiffletree $F^2$, connected to the line $D^2$, as stated, to another and separate pole, $J^2$. This pole $J^2$ in its normal position lies along the outer side of a rail or bar, $K^2$, which is secured at its outer end to the outer end of the center pole, $H^2$, and at its inner end to the front axle, with an open space between it and the center pole, and from one to the other of its said end fastenings. The fixed rail $K^2$ at its outer end loosely clasps and engages the sliding pole $J^2$, and this and the suspension of the inner end of said pole $J^2$ by the line $D^2$, as before explained, constitute the support for said pole. The pole $J^2$ is free to be moved forward and backward on and in a direction from end to end of the rail $K^2$.

The pawl $E^2$, before referred to, is suspended by a safety-chain, $t$, from the upright $L^2$ at front end of wagon-body, and the horizontal frame G H, pivoted to the cross-bar D of wagon-body, as has been described, is secured against accidental escape from its pivots $d$ by fastening-pins $M^2$, entered into said pivots outside of the side rails of said frame and each secured by a safety-chain, $N^2$, to the standards V at sides of wagon-body.

In the use of the apparatus and its attachment to a wagon, all as above described, to rake hay the several parts should be in the position of Figs. 1 and 4—that is, with the shoe-plate K at rest upon the ground and the rake-teeth presented to the ground just in advance thereof and the pawl $E^2$ engaged with the ratchet-wheel $B^2$. In this position of parts the rake-teeth are operative as a rake to rake the hay, and should any one or more of the rake-teeth meet with obstructions in the ground such tooth or teeth, each being capable of separate and independent operation from its construction described, is free to yield thereto with a spring and elastic resistance, and as it so yields, riding up over the raised forward edge of the shoe-plate, its point becomes protected and guarded by said shoe and thus further obstruction avoided, and it is made free to pass over and beyond the obstruction, as before stated.

The rake-teeth, having been sufficiently charged with hay to then dump the hay into the wagon, release the pawl $E^2$ from the ratchet-wheel $B^2$, on which the horse, harnessed to the whiffletree $F^2$ and sliding pole $J^2$, as stated, being then set free, in continuing his travel moves away from the wagon-body, unwinding the line $D^2$, connected to said whiffletree, and rotating the shaft X in a direction to wind up the other lines, T, connected to the rake-teeth frame N O P, and thus the rake-teeth are first swung upward and into position, making a cradle, as it were, Figs. 3 and 5, holding the hay on the teeth against accidental escape, and, finally, by the abutment of the rod N of the rake-teeth frame N O P against the under side of the side rails, G, of the frame G H, the upward swing of the rake-teeth is arrested, and they, with said frame G H, then swing together upward, and the rake-teeth, with their charge of hay, are carried to and over the wagon body into practically a vertical position, on which the hay is dumped into the wagon.

The mechanism operating as described and turning up the rake-teeth, all as stated, also and previous to commencing to swing said rake-teeth and the frame on which their carrying-bar P is journaled, as has been explained, swings the brake-levers $A^2$ in a direction suitable to apply their brake shoes on the tread of the hind wheels, and thus the further travel of the wagon is prevented, while the movement of the other parts of the apparatus is continued to secure the pitching and dumping of the hay, as has been described.

The operation of the apparatus to pitch and dump the hay, as described, is secured directly by one of the horses, which for such purpose travels forward along the center pole, $H^2$, drawing the line $D^2$ after him, as also the sliding pole $J^2$. The hay having been pitched and dumped, as stated, the horse then moves backward, carrying with him the sliding pole $J^2$, and allowing the line $D^2$, drawn out and unwound from shaft X, to be rewound upon said shaft from the then swinging backward and downward of the frame G H and its rake attachment, and when all have again reached their normal position, by engaging the pawl $E^2$ with the ratchet-wheel $B^2$ the rake is again in position to rake and the wagon made free to travel, and so on, as before. The apparatus described, as is plain, is practically and substantially all carried by the cross-bar D, which is attached to the bottom of the wagon-body, and thus by unscrewing the bolts $a$ and nuts $b$ fastening said bar all can be detached, and again the rake-carrying frame G H and the rake may, if desired, of themselves only be detached, so that the wagon may proceed without them by simply removing the fastening-pins $M^2$ therefrom and disconnecting the lines T from the cross-rod N, to which the rake-teeth are attached.

At the beginning of the raising of the rake-teeth and the frame carrying them, as has been particularly explained under the arrangement mentioned and described, the operating-shaft X therefor is at its greatest leverage, and when, as is obvious, it is most needed.

The raising of the rake and of its carrying-frame, as herein described, may be accomplished with the hands, and again the wagon may be adapted to utilize both horses for operating the rake, as has been explained; but one horse is sufficient.

Having thus described my invention, what I claim, and desire to secure by Letters Patent, is—

1. A frame, G H, at one end portion pivotally attached to and projected from the rear of a wagon-body, and a hay-rake having its frame journaled and swinging on said frame G H and adapted to engage it and the two frames to swing as one on the wagon-body, in combination with brake-shoes for the wheels of the wagon, lever-arms carrying said shoes and fulcrumed in the wagon, a horizontal shaft, X, turning on said arms, means adapted to hold said shaft against turning and to release it to turn, a sliding wagon-pole, $J^2$, a stationary support and guide, $K^2$, for said pole, a movable whiffletree, $F^2$, to which and said pole the horse is to be hitched, rope $D^2$, connecting the whiffletree and said shaft, and rope T, having suitable guides connecting said shaft and rake-frame, substantially as described, for the purpose specified.

2. A horizontal bar, D, detachably attached to a wagon-body, a frame, G H, at one end portion, pivotally attached to said bar and extended to the rear of the wagon, a hay-rake journaled on said frame G H and adapted to engage it and the two frames to swing as one on said bar, and means connected to said rake-frame and adapted to swing it and its supporting-frame into operative raking position and into a position over the wagon to dump the contents of the rake therein, in combination with brake-shoes for the wheels of the wagon, pivoted to said bar, and having operating lever-arms connected to and operated by said means for swinging said rake-frame, substantially as described, for the purpose specified.

3. In combination, a frame, G H, at one end portion pivotally attached to and projected from the rear of a wagon-body, a hay-rake having its frame journaled and swinging on said frame G H and adapted to engage it and the two frames to swing as one on the wagon, a horizontal rotatory shaft, X, of the wagon-body, means adapted to hold said shaft against turning and to release it to turn, rope T, having suitable guides and connecting said rake-frame and shaft, a sliding wagon-pole, $J^2$, a stationary support and guide, $K^2$, for said pole, a movable whiffletree, $F^2$, to which and said pole $J^2$ the horse is to be hitched, and rope $D^2$, or such like, connecting whiffletree and said shaft, substantially as described, and for operation and purposes as specified.

In testimony whereof I have hereunto set my hand in the presence of two subscribing witnesses.

MARVIN OWEN ROYCE.

Witnesses:
ALBERT W. BROWN,
FRANCES M. BROWN.